US010442995B2

(12) United States Patent
Felix et al.

(10) Patent No.: US 10,442,995 B2
(45) Date of Patent: Oct. 15, 2019

(54) RAPID PRODUCTION OF HYDROTHERMALLY CARBONIZED BIOMASS VIA REACTIVE TWIN-SCREW EXTRUSION

(71) Applicants: Larry G. Felix, Pelham, AL (US);
William E. Farthing, Pinson, AL (US);
James H. Irvin, Hoover, AL (US);
Todd R. Snyder, Birmingham, AL
(US); Wei Yan, Memphis, TN (US)

(72) Inventors: Larry G. Felix, Pelham, AL (US);
William E. Farthing, Pinson, AL (US);
James H. Irvin, Hoover, AL (US);
Todd R. Snyder, Birmingham, AL
(US); Wei Yan, Memphis, TN (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 1343 days.

(21) Appl. No.: 14/216,028

(22) Filed: Mar. 17, 2014

(65) Prior Publication Data
US 2014/0262727 A1 Sep. 18, 2014

Related U.S. Application Data

(60) Provisional application No. 61/789,835, filed on Mar. 15, 2013.

(51) Int. Cl.
| C10B 7/10 | (2006.01) |
| B29C 48/00 | (2019.01) |
| B29C 48/67 | (2019.01) |
| B29C 48/92 | (2019.01) |
| B29C 48/25 | (2019.01) |
| B29C 48/40 | (2019.01) |
| B29C 48/80 | (2019.01) |
| C10L 9/08 | (2006.01) |

(52) U.S. Cl.
CPC .............. *C10B 7/10* (2013.01); *B29C 48/022*
(2019.02); *B29C 48/268* (2019.02); *B29C 48/402* (2019.02); *B29C 48/67* (2019.02);
*B29C 48/832* (2019.02); *B29C 48/834*
(2019.02); *B29C 48/92* (2019.02); *C10L 9/086*
(2013.01); *B29C 2948/92704* (2019.02)

(58) Field of Classification Search
CPC .............. A21D 8/00; C10B 7/10; C10L 9/086
See application file for complete search history.

(56) References Cited

U.S. PATENT DOCUMENTS 3,841,465 A   10/1974 Miller, Jr. et al.
4,477,257 A * 10/1984 Koppelman .............. C10F 5/06
44/632

(Continued)

FOREIGN PATENT DOCUMENTS

WO   WO 2011/000030 A1   1/2011
WO   WO 2011/047696 A1   4/2011
WO   WO 2011/117280 A1   9/2011

*Primary Examiner* — Jill A Warden
*Assistant Examiner* — Dwayne K Handy
(74) *Attorney, Agent, or Firm* — Pauley Erickson & Kottis

(57) ABSTRACT

A system for the production of carbonized biomass that includes an infeed for accepting biomass feed material and an associated twin screw extruder. A water heater is connected with respect to at least one inlet along a length of the twin screw extruder and a pressure sustaining valve is connected at an outlet of the twin screw extruder.

19 Claims, 14 Drawing Sheets

(56) References Cited

U.S. PATENT DOCUMENTS

| | | | |
|---|---|---|---|
| 4,632,795 | A | 12/1986 | Huber et al. |
| 4,728,367 | A | 3/1988 | Huber et al. |
| 4,963,033 | A | 10/1990 | Huber et al. |
| 5,114,488 | A | 5/1992 | Huber et al. |
| 5,417,992 | A * | 5/1995 | Rizvi .................... A21C 1/003 366/85 |
| 6,419,788 | B1 | 7/2002 | Wingerson |
| 6,620,292 | B2 | 9/2003 | Wingerson |
| 7,521,076 | B1 | 4/2009 | Wenger et al. |
| 7,600,707 | B2 | 10/2009 | Wingerson |
| 7,717,364 | B2 | 5/2010 | Wingerson |
| 7,850,904 | B2 | 12/2010 | Osato et al. |
| 8,637,718 | B2 | 1/2014 | Gupta et al. |
| 2006/0280669 | A1 | 12/2006 | Jones |
| 2006/0283995 | A1* | 12/2006 | Wingerson .............. D21B 1/30 241/101.2 |
| 2008/0006518 | A1* | 1/2008 | Shimojo ................ C10B 53/02 201/20 |
| 2008/0029233 | A1* | 2/2008 | Wingerson .............. D21C 7/00 162/60 |
| 2010/0184176 | A1 | 7/2010 | Ishida et al. |
| 2010/0224268 | A1 | 9/2010 | Wingerson |
| 2011/0056125 | A1 | 3/2011 | Antonietti |
| 2011/0112246 | A1 | 5/2011 | Antonietti et al. |
| 2012/0000120 | A1 | 1/2012 | Stark et al. |
| 2012/0291343 | A1 | 11/2012 | Schendel et al. |
| 2017/0029733 | A1 | 2/2017 | Felix |

* cited by examiner

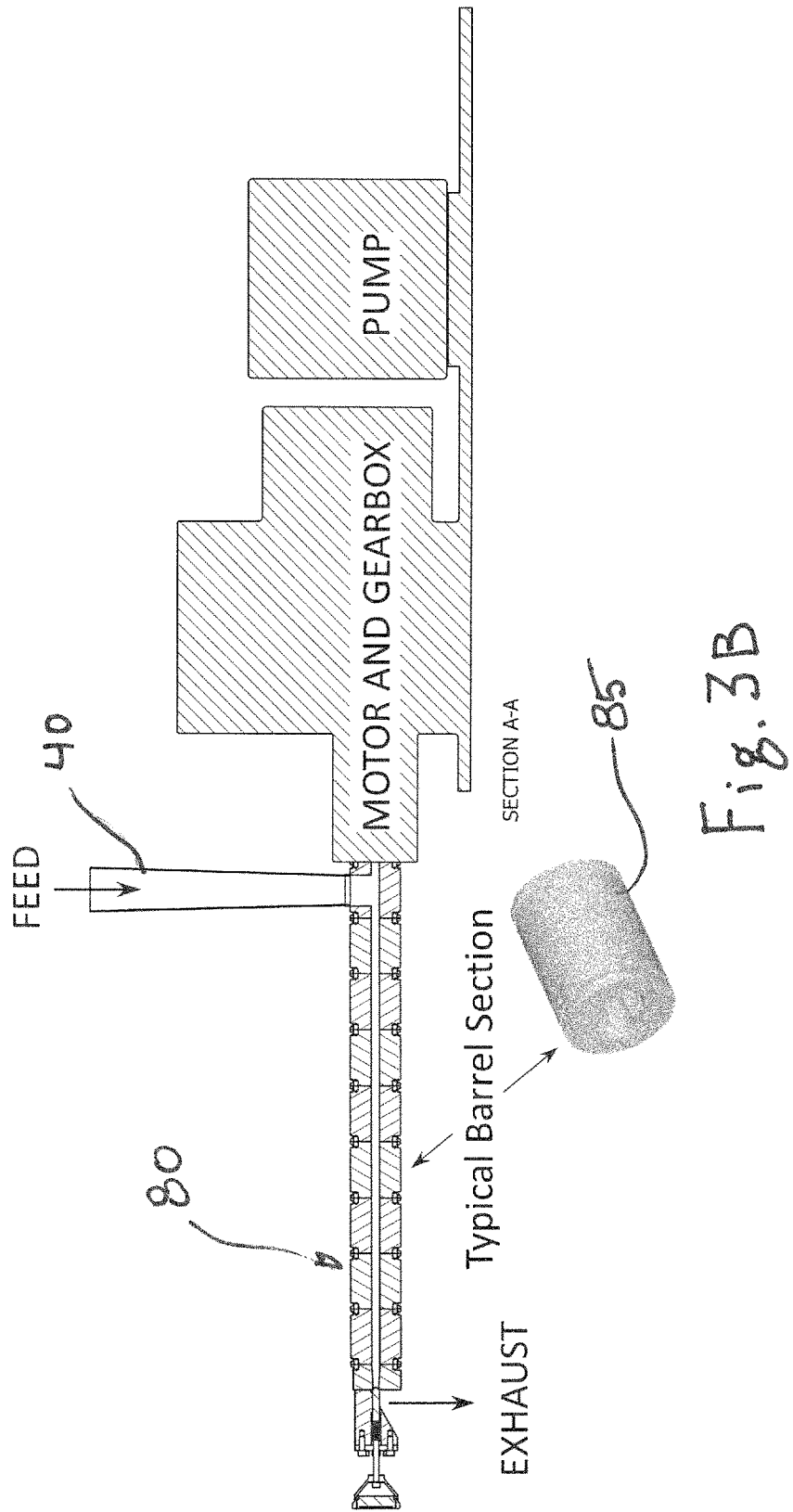

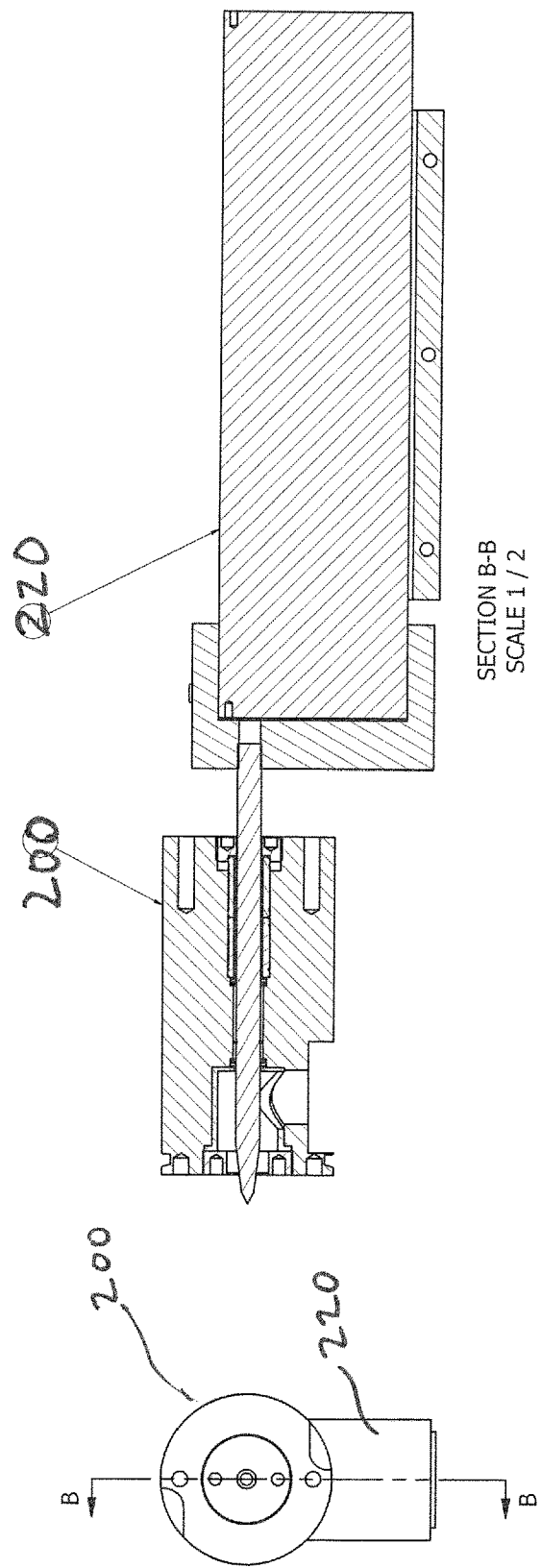

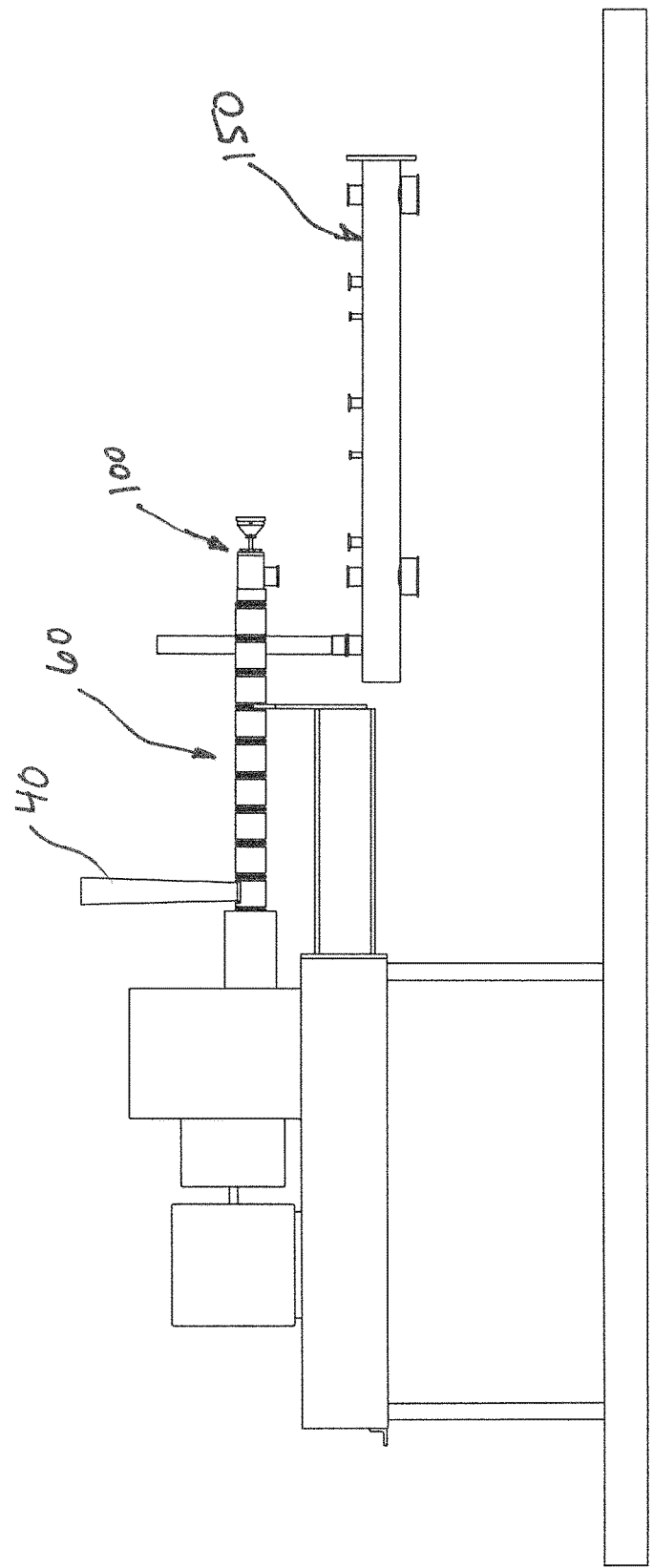

US 10,442,995 B2

RAPID PRODUCTION OF HYDROTHERMALLY CARBONIZED BIOMASS VIA REACTIVE TWIN-SCREW EXTRUSION

GOVERNMENT RIGHTS

This invention was made with government support under Contract No. DE-FG36-10GO11082 awarded by the U.S. Department of Energy. The government has certain rights in the invention.

BACKGROUND OF THE INVENTION

Field of the Invention

This invention relates to system and method for producing carbonized biomass using a twin-screw extruder.

Description of Related Art

The Hydrothermal Carbonization (HTC) of biomass, primarily lignocellulosic biomass, to produce a densified carbon product (biochar) is known in the art. Presently, HTC is most often carried out with mixtures of biomass and water in a sealed batch reactor (typically a Parr Reactor, maintained at 200-300° C. for 0.1 to 1 hour) of the sort invented by Friedrich Bergius who first developed the tools and techniques required to study the reactive chemistry of compounds subjected to high pressures and temperatures. Dr. Bergius was awarded a Nobel Prize for his work in high-pressure chemistry in 1931.

Because HTC biomass resembles coal, one early use of HTC technology was to produce a coal-like material from the different constituents of lignocellulosic biomass and then attempt to relate the chemical and mineral characteristics of the HTC biomass product to the components of coal as known through petrographic analysis. The HTC process tends to remove oxygen and some hydrogen from biomass and produce a material that is similar to a low-rank coal. FIG. 1 shows a diagram first developed by Van Krevelen which reveals the difference between Loblolly pine biomass and typical US coals as a function of the ratio of atomic hydrogen to carbon when graphed as a function of the atomic ratio of oxygen to carbon. This figure suggests that HTC pine biomass is chemically similar to low-rank coal.

FIG. 2 shows a similar diagram that includes a number of measurements for raw lignocellulosic biomass and similar biomass that has been mixed with water and subjected to HTC in batch Parr reactors to produce a biochar.

In this study, three woody and three herbaceous biomass feedstocks were subjected to HTC in a Parr reactor. Each feedstock was treated in liquid water for 30-minutes at temperatures ranging from 175° C. to 295° C. Gaseous, aqueous, and solid hydrochar products were characterized to examine the effects of process temperature upon product yields, compositions, and energy densification. With increasing temperature, the mass of solid hydrochar product was reduced, and its energy density increased. At temperatures ≥255° C., hydrochars produced from the woody feedstocks had energy contents of 28-30 MJ/kg, comparable to sub-bituminous coal. Hydrochars from the herbaceous feedstocks had lower energy contents, but still showed 20-40% energy densification compared to raw materials. Energy densification by the HTC process involves preferential loss of oxygen. With increasing process temperature, the atomic O/C ratio was reduced from 0.6-0.7 in raw feedstocks to approximately 0.2 for all hydrochars produced at ≥275° C. Yields of gaseous products (consisting predominantly of $CO_2$) increased with increasing HTC temperature, reaching 10-12% at temperatures ≥275° C. The sum of sugar and organic acid yields in the aqueous product fraction was typically 8-12%, at process temperatures ≥215° C., although the detailed composition of these products varied considerably with temperature. Water is also produced by the HTC of biomass. One of the inventors has reported water production yields ranging from 4-20%, as a percentage of starting dry mass, for a variety of biomasses subjected to HTC at a processing temperature of 255° C.

SUMMARY OF THE INVENTION

This invention relates to a method and system for the production of carbonized biomass that includes an infeed for accepting biomass feed material and an associated twin-screw extruder. A water heater which is connected with respect to at least one inlet along a length of the twin-screw extruder and a pressure sustaining valve which is connected at an outlet of the twin-screw extruder. As described herein, the resulting system is capable of fast start up times to full production capacity and efficient energy consumption resulting in a carbonized biomass with various applications.

BRIEF DESCRIPTION OF THE DRAWINGS

These and other objects and features of this invention will be better understood from the following detailed description taken in conjunction with the drawings.

FIG. 3B is a cross-sectional view of the twin-screw extruder shown in FIG. 3A, taken along Section A-A.

FIG. 10A shows an end view of an automated pressure sustaining valve, including a linear motor drive, indicating the plane of Section B-B, according to one preferred embodiment.

FIG. 10B shows a cross-sectional view of the automated pressure sustaining valve and the linear motor drive, taken along Section B-B, according to one preferred embodiment.

FIG. 11 shows a side view of a system according to one preferred embodiment of this invention, including an inline downstream mixer/blender for continuous mixing & blending of the HTC product with biomass, torrefied biomass, or coal, subsequent to pelletization or briquetting.

DESCRIPTION OF THE PRESENTLY PREFERRED EMBODIMENTS

Figure 1:
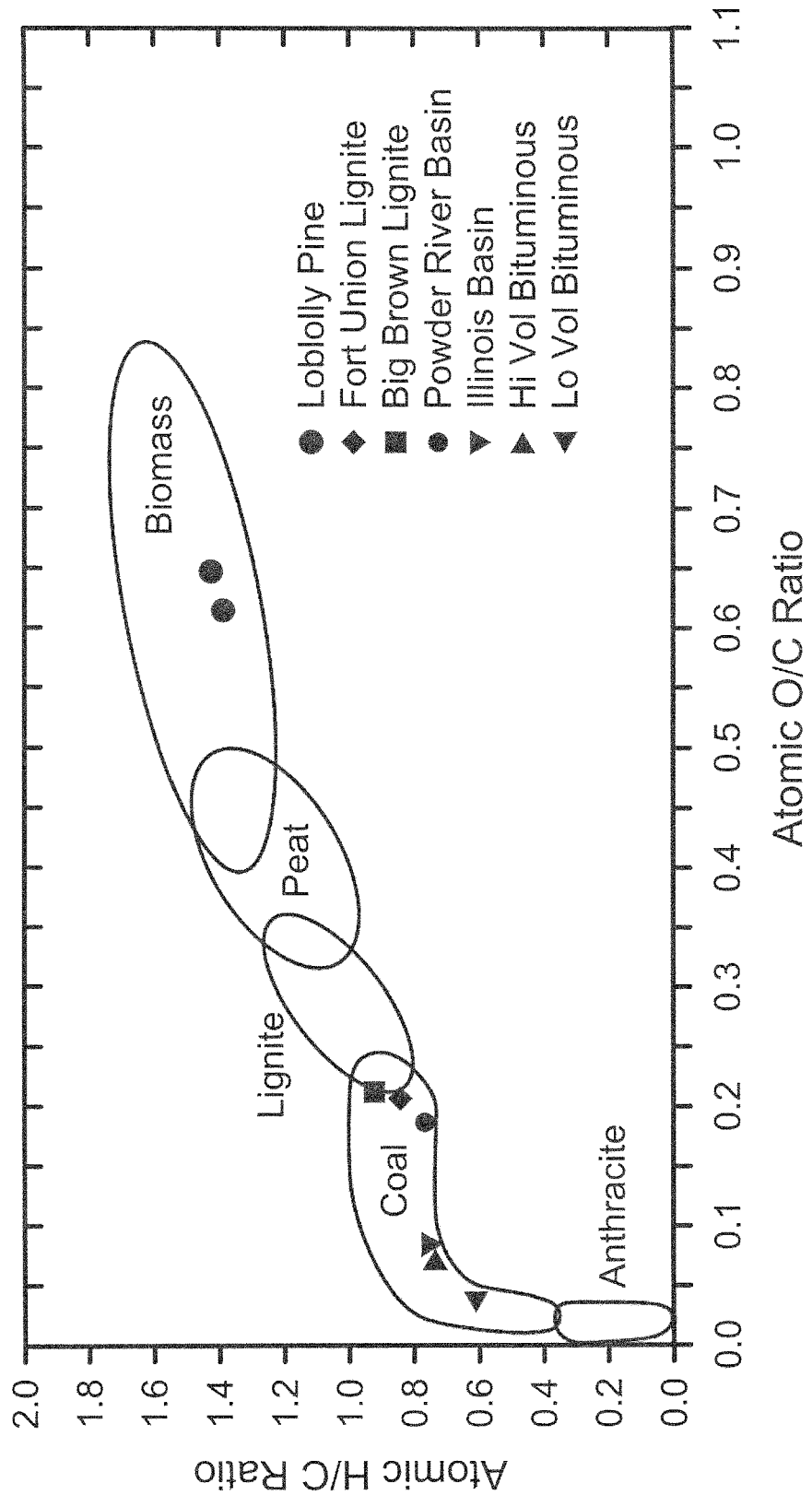
FIG. 1 shows a chart of atomic O/C ratio versus atomic H/C ratio for selected coals and biomass (loblolly pine).
Figure 2:
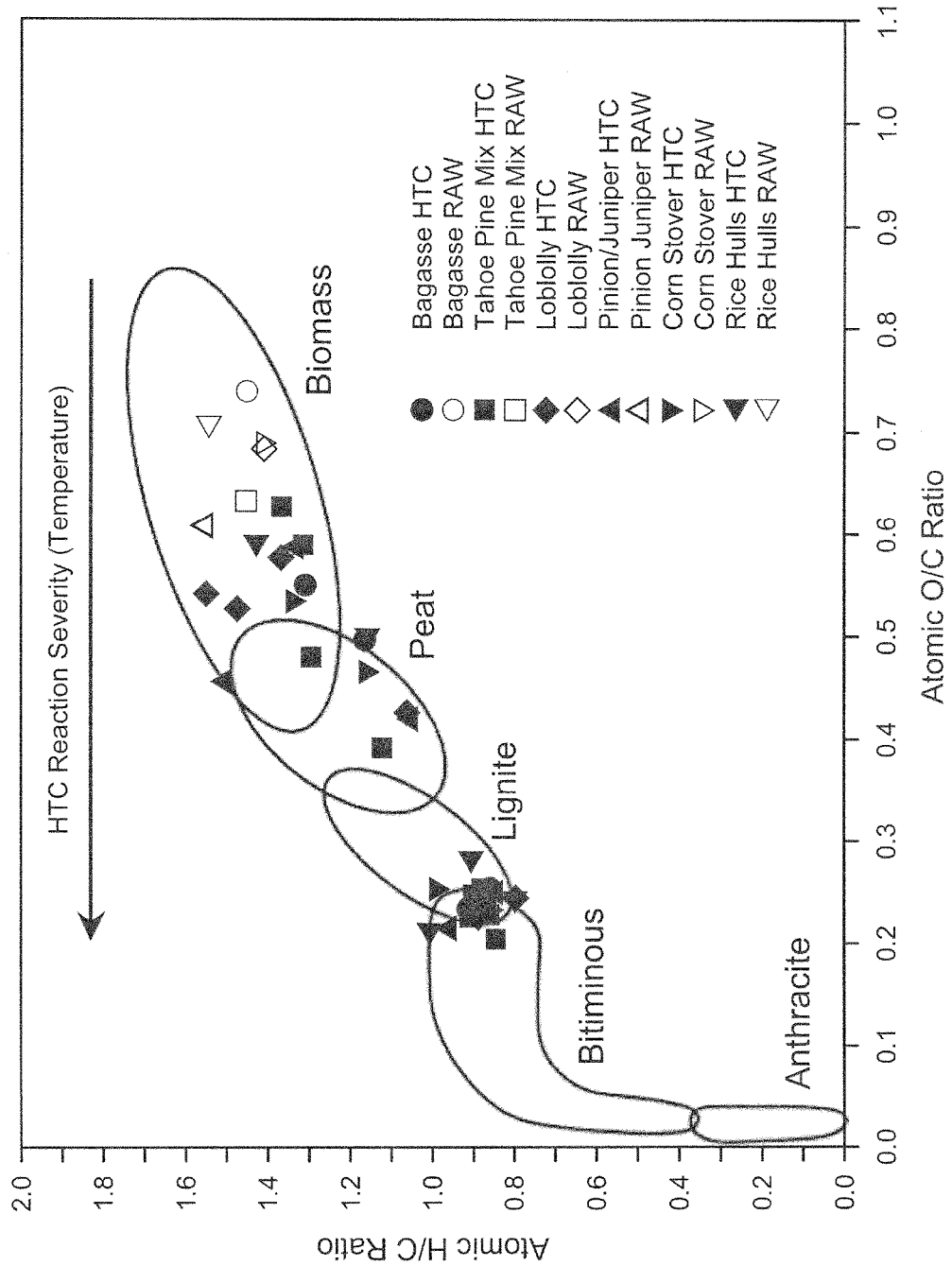
FIG. 2 shows a chart that includes a number of measurements for raw lignocellulosic biomass and similar biomass that was been mixed with water and subjected to HTC in batch Parr reactors to produce a biochar.

HTC biomass differs from coal in important ways. First, aside from being depleted in oxygen and hydrogen when compared to parent biomass, the biochar from the hydrothermal carbonization (HTC) of biomass contains decomposition products of hemicellulose (including 5-hydroxy methyl furfural or 5-HMF) and cellulose (furfural derivatives, phenols and other organic compounds) that serve as excellent binders for pelletizing HTC biochar. While HTC biochar can be pelletized or briquetted at relatively low temperatures and pressures (~100° C., 27 MPa, for several seconds), to form strong pellets, only moderate temperatures are required (for 13 mm pellets, a die temperature of 140° C. and 440 MPa for 30 seconds in a laboratory pellet press). The HTC process has been found to create binders that allow HTC biochar to be pelletized into robust, weather-resistant pellets that are unaffected by submersion in water for over six months. Also, depending on the temperature at which HTC is carried out, HTC biochar can contain up to 25 wt. % acetone-extractable compounds that function as a robust binder for pelletizing coal, other biomass, and torrefied biomass at relatively low levels of addition (2-5%). Interestingly, acetone-extracted HTC biochar has been found to retain the capacity to form durable, waterproof pellets.

The results cited above relate to biomass processed in small batch Parr Reactors. In the literature, data such as that referenced above has been used to carry out techno-economic studies of scaled-up batch-based processes for producing commercial quantities of HTC biochar. These studies suggest that batch-based processing is probably not a commercially viable technology unless markets for HTC biochar or chemicals derived from the liquids produced in HTC increase in value. Therefore, unless a faster, simpler process for producing HTC biomass is developed, this technology may remain only an interesting approach for densifying biomass.

Production of HTC Biochar with Reactive Twin-Screw Extrusion

Research has produced much information about HTC biochar as produced in conventional batch reactors. However, the ultimate focus of such research is to create a commercially viable, rapid technology for creating large quantities of HTC biomass and value-added chemicals on a continuous basis as opposed to a batch-based approach. As a result of an extended R&D effort, the subject invention results in an easily pelletized biochar (incorporating acetone extractables that are themselves durable pelletizing agents) along with the same liquids that are created when HTC is carried out in batch reactors: liquids that contain a variety of decomposition products of hemicellulose and pentose sugars that predominate in hemicellulose as well as a variety of decomposition products of cellulose and hexose sugars that predominate in the cellulose polymer. Also, like the solid HTC biomass produced in Parr reactors, HTC biochar produced by our novel approach is hydrophobic. If a sample of this wet HTC biochar (~75 wt. % water) is exposed to room air, within one day it has been found to dry to ≤15 wt. % water. After a second day of exposure to room air, it has been found to stabilize at ~2 wt. % water.

Figure 3A:
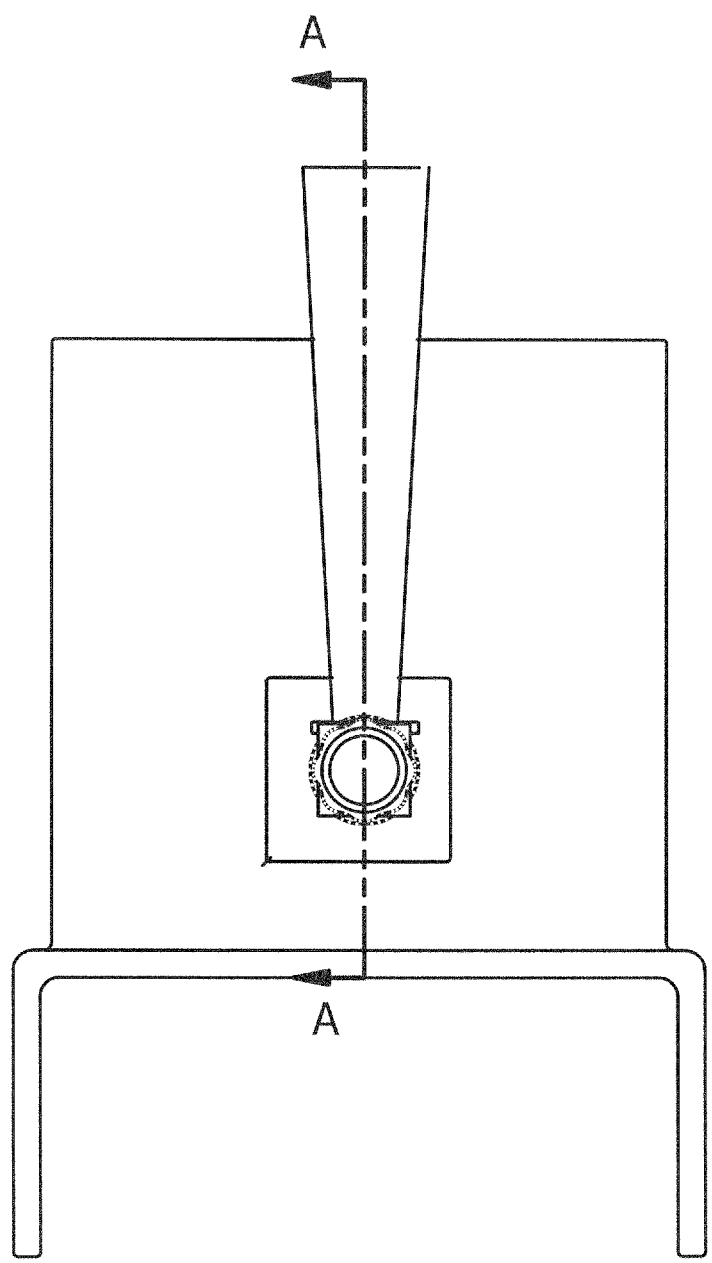
FIG. 3A shows a front view of a twin-screw extruder used to prepare HTC biomass according to one preferred embodiment, showing the plane of Section A-A.
Figure 4:
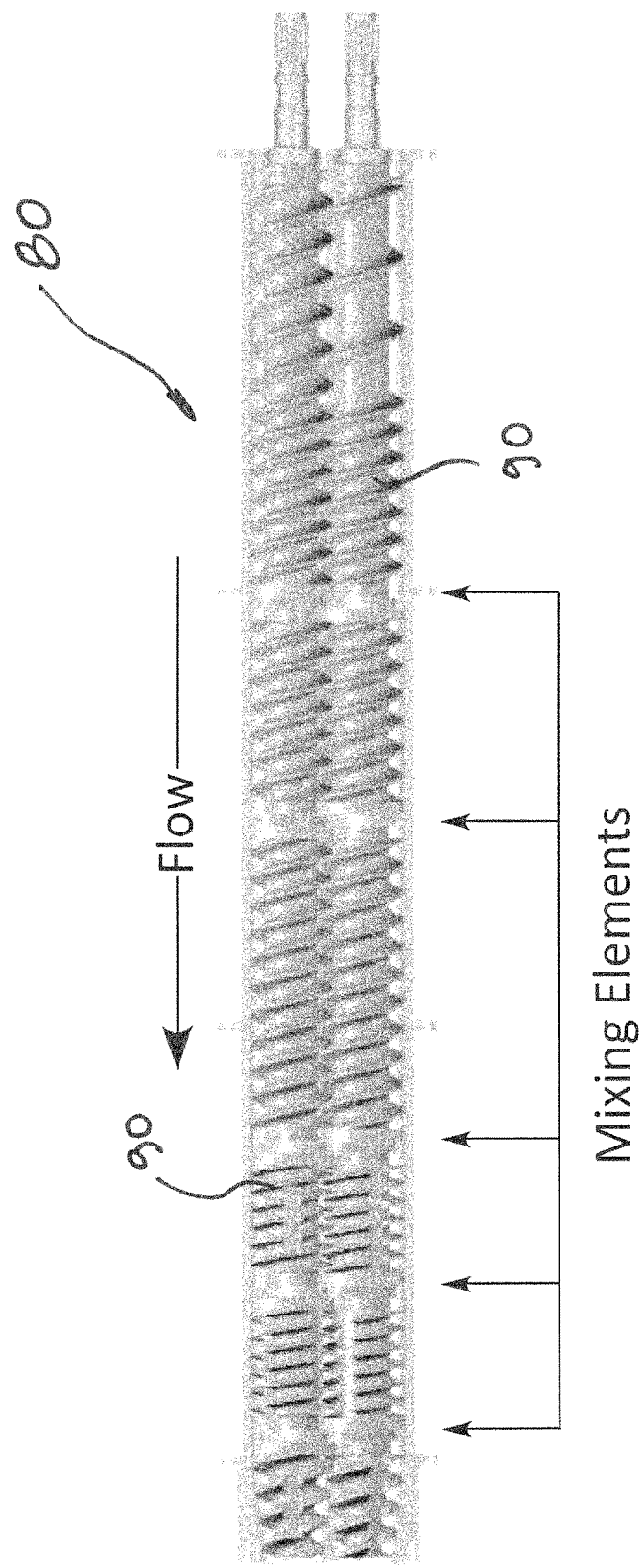
FIG. 4 is a cross-sectional view of intermeshing screw sections within a twin-screw extruder showing only mixing elements.

The novel fast technology that permits the continuous production of an HTC biochar and associated liquids preferably includes a specially equipped twin-screw extruder ("TSE") 80, such as shown schematically in FIGS. 3-5. The TSE as described is preferably capable of sustaining continuous internal processing temperatures up to 300° C. and internal material pressures of up to 350 bar. The subject invention preferably further includes a specialized on-demand source of hot water (generally, up to 370° C. and up to 210 bar). Finally, the subject invention preferably further includes a specialized dual-function variable restriction at the discharge end of the extruder that permits HTC product and liquids to be exhausted from the extruder while maintaining a relatively constant process pressure within the extruder to permit the continuous production of an HTC product.

Twin-Screw Extruder

The novel fast HTC technology according to a preferred embodiment of this invention preferably includes a twin-screw extruder (TSE) 80 to rapidly transform lignocellulosic biomass into a wet HTC solid. FIGS. 3A and 3B show one preferred embodiment of this invention. In a preferred embodiment, the TSE comprises a Clextral 25 mm BC-21 TSE with selectable co-rotating or counter rotating screws with an integrated hydraulic ram for screw extraction. According to one preferred embodiment, the TSE 80 is configured with 9 barrel sections 85. Barrel 1 may comprise a feed inlet port and barrels 2-9 are preferably rated for 250 bar (3,625 psi) at temperatures up to 300° C. (572° F.) continuous operation and 400° C. (752° F.) excursion. All 9 barrel sections preferably include thermocouples that measure barrel temperature via integrated thermo wells and barrels 2-9 each include pressure transducers, injection ports, internal cooling channels and 1250 W band heaters to maintain a particular barrel section at temperatures and pressures required to produce HTC biochar in a continuous manner. Biomass is preferably fed into the BC-21 TSE via an integrated K-iron KS-60 volumetric feeder configured for small wood chips. According to a preferred embodiment, the BC-21 TSE is equipped with a dedicated datalogger that records process parameters at one-second intervals. This TSE is housed in a laboratory specially configured to safely capture and process the solids, vapors, gases and liquids created during the production of HTC biochar. A cross-sectional schematic of a preferred embodiment of the production device is shown in FIG. 3B and further shows an infeed, a motor and gearbox and an associated pump.

To carry out the conversion of lignocellulosic biomass to an HTC product with a TSE 80, the TSE 80 is preferably configured with individual temperature-controlled heated and cooled barrels 85 so that each barrel section of the extruder functions as a localized transport reactor. In a TSE of the sort shown in FIG. 3B, individual short screw sections deployed on twin splined shafts that extend through the extruder configured to convey properly sized biomass from the point where it enters the extruder at the infeed 40 through a series of internal reactor sections to a point where the HTC product and associated liquids are delivered across the dual-function, variable-restriction pressure sustaining valve (the point marked "EXHAUST"). Each small screw section can be of a different pitch so that when "stacked" on a splined or threaded shaft, the rate at which material is conveyed through the TSE can vary while the rotational speed of the shafts upon which the screw sections are deployed is maintained constant. By the interspersing of short, specialized reversing elements, robust pressure boundaries can be maintained that create separate sections at much higher or lower internal pressures than preceding or succeeding sections. The above description represents one preferred method for constructing each of the pair of long, intermeshing, multi-segmented screws that extend within and along the length of the barrel sections of the TSE. FIG. 4 shows one embodiment of how twin shafts of screw segments intermesh within the barrels of a TSE. However, FIG. 4 shows only mixing elements 90, and not reversing elements 95 (both shown in FIG. 5B), making this screw configuration unsuitable for use for producing HTC.

Methods other than reversing elements 95 exist for creating pressure boundaries with a TSE, for example, devices that create variable apertures to reduce the cross-sectional area of a TSE to restrict flow and thereby define a zone of increased pressure upstream of the obstruction. This approach may be useful for creating pressure boundaries with uniform, nonfibrous materials, however for compressed biomass such an approach may necessitate higher power consumption than that required by recirculating screw sections. Certainly, recirculating screw sections also serve to thoroughly masticate fibrous biomass.

Figure 5A:
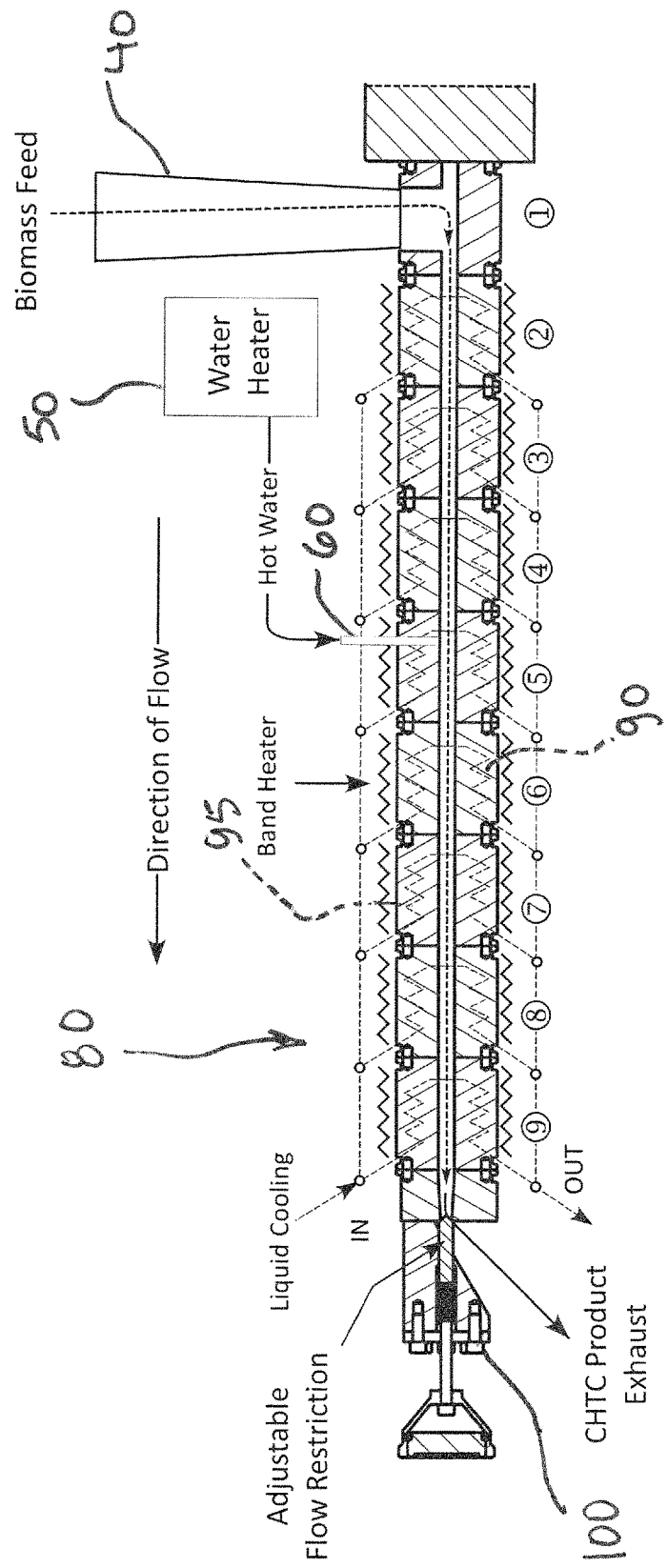
FIG. 5A is a schematic cross-sectional side view of a system according to one preferred embodiment.
Figure 5B:
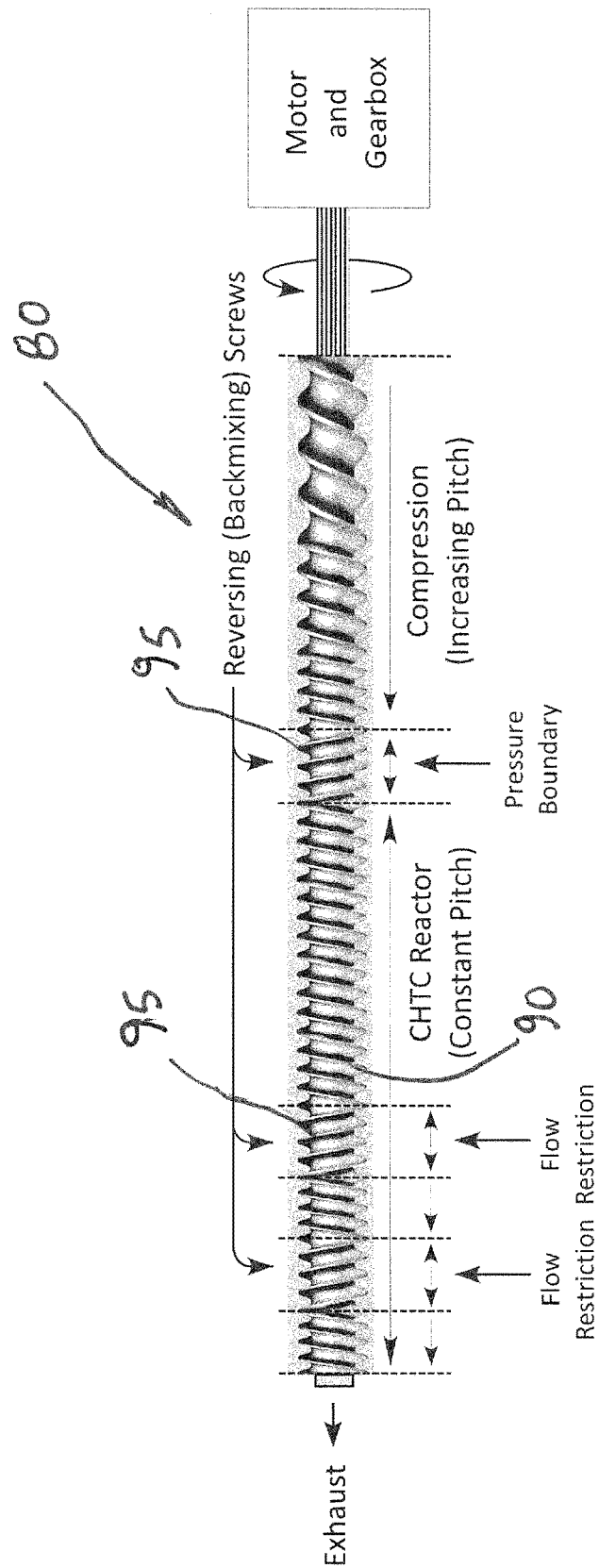
FIG. 5B is a schematic cross-sectional side view of the twin-screw extruder arrangement for use in connection with the system shown in FIG. 5A with a schematic cross-sectional view of a configuration of one of two intermeshing screw sets configured along splined shafts that move particulate biomass introduced at the right to the left as the HTC reaction proceeds and is completed with the ejection of an HTC product, according to one preferred embodiment.

FIGS. 5A and 5B show more detailed cross-sectional views of the system and barrel sections of the BC-21 TSE, according to one preferred embodiment of this invention, along with a typical arrangement of screw sections on one of the two splined shafts within the TSE. As noted above, the arrangement of forward and reversing screw sections, such as shown in FIG. 5B, is important as when properly configured, a TSE can become a series of chemical reactors separated by robust pressure boundaries created at each reversing screw element.

Following is a discussion of how HTC biomass is created with a TSE according to a preferred embodiment of this invention. A specific embodiment of the invention is shown, although after the approach described is understood, other embodiments known to one skilled in the art may be envisioned that contain, for example, multiple reactor sections.

FIGS. 5A and 5B show a TSE with screw sections arranged to create a first recirculating pressure boundary after biomass has been fed into the TSE and has been masticated and compressed in the compression section 95 of the TSE shown above. Biomass is defibered as it passes through and is recirculated in the first pressure boundary that is maintained at a moderate temperature, approximately 110-130° C., to facilitate the decomposition of hemicellulose and improve flowability of the biomass. This dynamic seal has been found to be unexpectedly robust, and capable of withstanding downstream pressures greater than 200 bar.

The defibered biomass then passes into the HTC reactor, shown as a section of constant pitch screw feed elements in FIG. 5B, although screw sections of various pitches can be utilized. The pressure boundary has been found to be quite robust, maintaining continuous material pressures at a pressure boundary of 40-60 bar with typical downstream internal reactor pressures of 55 to 85 bar at approximately 230-290° C. Note the location of a hot water injection port 60 in the BC-21 TSE schematic cross-section is shown immediately after the pressure boundary 1. The injection of high temperature water (typically at 230° C. or above so that hot liquid water enters the reaction section to mix with the defibered and decomposing biomass) is located to provide a surfeit of water required for the HTC reactions to proceed in a rapid manner. Water is injected at this point for another important reason: water flows into the reaction section downstream but it also infiltrates and lubricates biomass exiting the pressure boundary 95 thereby reducing the specific mechanical energy required to transport biomass across this dynamic seal. Further, at these temperatures and pressures water is known to have a pH of ~3, making it a strong acid that is capable of carrying out acid hydrolysis of biomass by itself. Thus, in this invention under the conditions described above, no acid needs to be added to cause or improve hydrolysis. Also, note that no copolymerizing or other chemical agents are required to create an HTC product. This practice also distinguishes the use of a TSE in this invention from other inventions intended to continuously create a HTC product from lignocellulosic biomass.

Screw speeds of 150 to 400 revolutions per minute are preferably employed to transport biomass rapidly through the reactor section, presently 30-45 cm of length which could be longer or shorter, depending on the degree of HTC desired for the final product. Indeed, a TSE that incorporates more barrels in the reactor section inherently provides for increasing residence time and degree of the HTC reaction. In the HTC reactor, cellulose in biomass tends to decompose and along with the previously decomposed hemicellulose create a mixture of water, HTC biochar, acids (e.g., acetic, formic, lactic, levulinic), furan resins from the condensation and polymerization of furfural (from decomposed hemicellulose), and 5-hydroxymethylfurfural (from decomposed cellulose), phenolic polymers from lignin (including phenol-aldehyde resins), and gases, primarily $CO_2$. The solids, liquids, and gases (when at room temperature and pressure) pass from the reactor through multiple recirculating flow restrictions that tend to increase residence time and provide a final opportunity for mixing to take place. It is important to note that much of the solids in the biomass that entered the TSE have been masticated and decomposed into liquids and gases and the paste-like material that exits the reaction section cannot be restrained by a recirculating zone to form a downstream pressure boundary such as that created upstream at the start of the reaction section.

In the Clextral BC-21 TSE, the total transit time for biomass through the reaction section is typically on the order of 15 to 30 seconds. This may seem unusually quick, however, in laboratory tests carried out in a small, two-section Parr reactor, where biomass could be isolated from hot water, one of the inventors showed that at 260° C., the HTC reaction could be completed in under one minute.

Thus, it is reasonable, though unexpected that HTC biomass can be processed to levels of severity found in Parr reactors in commercial TSEs.

Based on Parr reactor measurements, when HTC is carried out at ~260° C., only about 63% of the biomass solids that enter the reactor remain after the HTC reactions are completed, along with the conversion of approximately 20% of the biomass into $CO_2$, and 6% of the biomass into acetic acid. While this mass balance is typical of HTC carried out in a Parr reactor, when HTC is carried out in a TSE, we expect that a similar partition of biomass will occur. Initial proof-of-concept experiments carried out with the BC-21 in a laboratory suggests that this will be the case. However, because residence time within the reactor can be varied by, for example, varying the rotational rate of the screws, total mass flow rate and water/biomass ratio, different degrees of reaction can be achieved and HTC biomass processed at lower reaction severity (e.g., shorter reaction time, lower temperature, etc.) can retain a fibrous appearance and texture while HTC biomass processed at a higher reaction severity (e.g., longer reaction time, higher temperature, etc.) will have a smooth, paste-like appearance and texture.

The loss of solid mass in the reactor due to the HTC reaction and production of a relatively low viscosity, flowable, fibrous or smooth paste preclude creating a pressure boundary based on product recirculation via reversing screw sections in the downstream section of the reactor. When the TSE is first started up, if a pressure boundary, created by flow-reversing screw sections, downstream of the reactor is properly sized to accept most of the solids that enter the TSE (before HTC production stabilizes) they will be unable to maintain a robust pressure boundary after continuous HTC production has stabilized as the ratio of solids to liquids and gases has changed and the nature of the low viscosity flowing materials entering these seals is now changed. In this situation, the pressure boundaries will be oversized and will not be able to withstand the pressures generated within the reactor section. In addition, if recirculating pressure boundaries downstream of the reactor section are undersized, incompressible hot water injected in the front of the reactor section could infiltrate and dilute the remaining solids and further destabilize the two downstream pressure boundaries.

For this reason, two or more (as required) flow restrictions are preferably positioned at the end of the reactor section to improve mixing and a special dual-function, variable-restriction pressure-sustaining valve is located at the discharge of the process so that the low-viscosity HTC product can be delivered to a product container maintained at ambient pressure. The purpose, design, and function of this valve are discussed in more detail below.

An important parameter for characterizing the performance of a TSE is specific mechanical energy ("SME"). SME quantifies the cumulative effect of energy input along the entire screw axis within a TSE and is a single parameter that represents the energy transfer from the main drive motor through frictional heating for transporting biomass to and through the first dynamic seal, mixing and transport through the reactor section where HTC reactions occur, energy required to recirculate the flowing HTC product in downstream flow restrictions as well as the mechanical energy required to transport the HTC product across the downstream pressure boundary provided by the dual-function variable restriction pressure sustaining valve whose function is detailed below. The calculation of SME is performed using the extruder motor load (e.g. shaft torque determined by using percent torque instrumentation or through direct measurement of power from the main drive), screw speed and total throughput to provide energy input on a unit mass basis.

Figure 6:
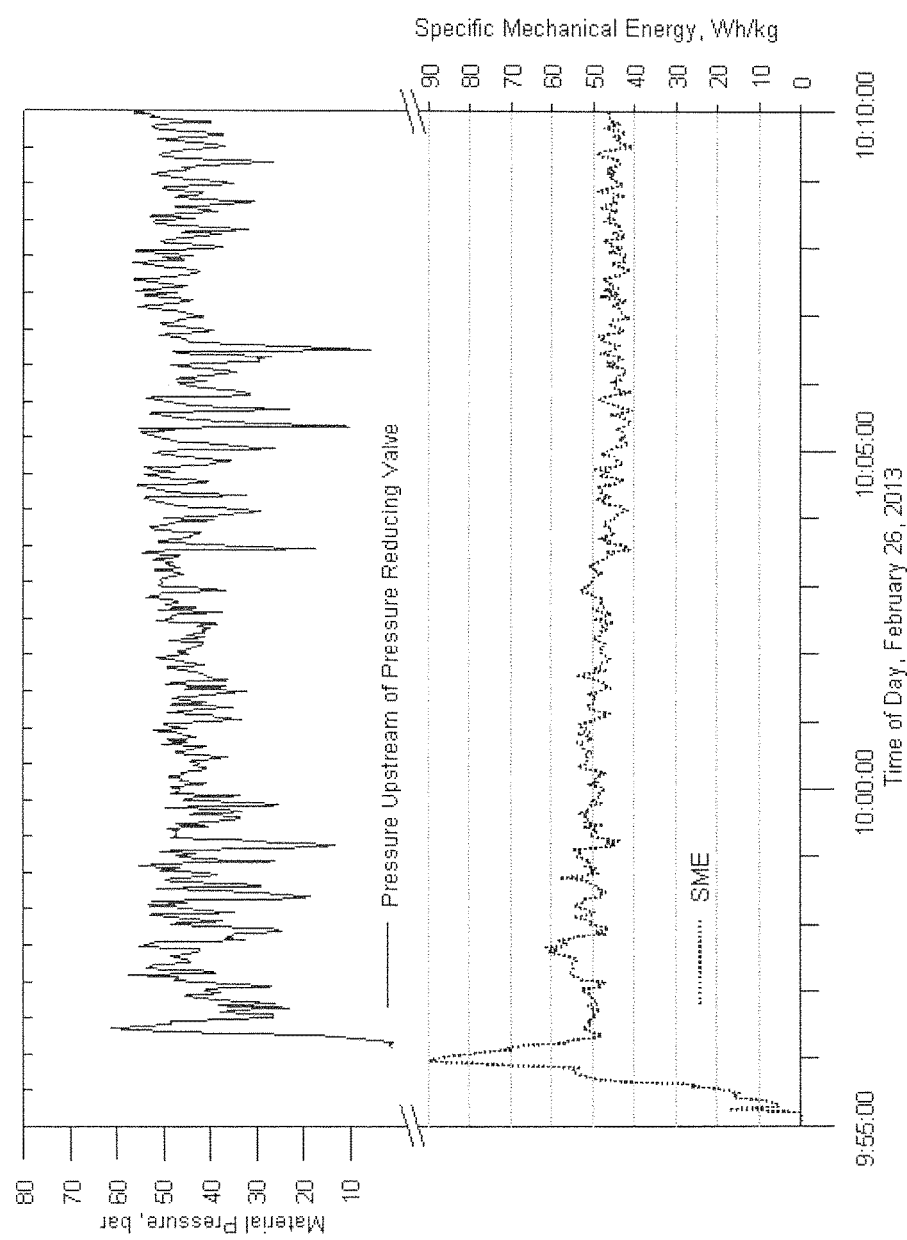
FIG. 6 shows system behavior at startup of HTC production with Specific Mechanical Energy ("SME") spiking as biomass reaches the set of reversing screws that create the dynamic pressure seal and after less than 2 minutes after startup, the HTC product reaching the variable-restriction pressure-sustaining valve with commencement of stable HTC production.
Figure 7:
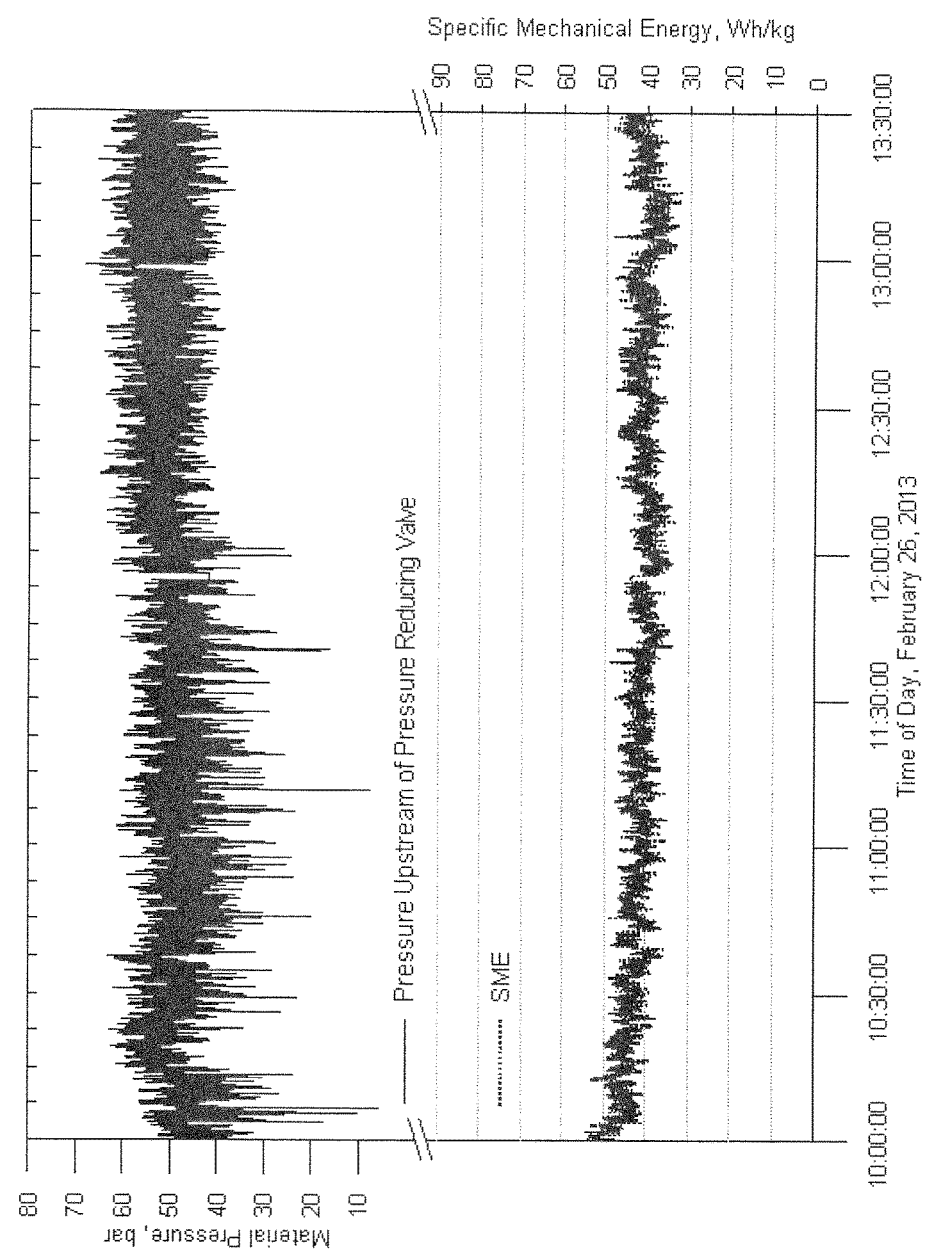
FIG. 7 shows that the stable process behavior shown in FIG. 6 remains unchanged over 3.5 hours of operation and also shows that SME tends to slowly decrease for approximately 30 minutes after startup and thereafter remain stable within a narrow band of operation.

In terms of creating HTC biomass, on startup, SME briefly peaks while the first dynamic seal is established and hot water injected immediately downstream of the dynamic seal mixes with masticated biomass leaving the dynamic seal as it enters the reaction section. Thereafter, as HTC processing proceeds, high-pressure hot water continues to mix with and convey biomass into the reaction section while flowing upstream and lubricating the downstream side of the seal. Thereafter, SME decreases and stabilizes, remaining within ~10% of its average value throughout production. FIGS. 6 and 7 document this behavior for HTC production testing.

FIGS. 6 and 7 show SME and pressure at the HTC product exhaust as a function of time directly after start-up. In FIG. 6, behavior at startup of HTC production shows SME spiking as biomass reaches the set of reversing screws that create the dynamic pressure seal. These data also show that less than 2 minutes after startup, the HTC product reaches the variable-restriction pressure-sustaining valve and stable HTC production commences.

After the HTC product reaches the variable-restriction pressure-sustaining valve, SME drops and ~8 minutes after startup, SME oscillates in a narrow band while pressure directly upstream of the variable-restriction pressure-sustaining valve tends to oscillate from 10% above to 10% below its average value. Note that in this test, a proof-of-concept example of this valve design was in place. Later versions of this valve operate with much less variation. FIG. 7 shows that the stable process behavior shown in FIG. 6 remains unchanged over 3.5 hours of operation. FIG. 7 also shows that SME tends to slowly decrease for approximately 30 minutes after startup and thereafter remain stable in a narrow band of operation. The behavior outlined above is unexpected and the low values of SME that characterize stable HTC production are not intuitive.

A brief inspection of literature from Bühler AG suggests that for typical TSE's producing foodstuffs, SME can be equal to or much higher than is required to produce I-ITC from wood:

For indirect expanded cereals and snacks, SME ranges of 50 to 80 Wh/kg are common For direct expanded snacks, SME ranges of 80 to 120 Wh/kg are common For pet-food production, SME ranges of 30-60 Wh/kg are common For aqua-feed production, SME ranges of 15-40 Wh/kg are common Hot Water Heater As described above, a unique on-demand hot water heating system 50 is preferably employed in connection with this invention. Within a TSE, HTC must be carried out in a sufficiency of water to insure that acid hydrolysis and other HTC reactions are carried out (in proof of concept experiments, ~6.5 kg/h of 20% moisture biomass was fed to the TSE along with from 6.5 to 15.5 kg/h of water). This system preferably employs a high-pressure pump coupled with novel, precision back-pressure regulation and water recirculation system to continuously deliver water to an on-demand water heater that is capable of rapidly heating liquid water to temperatures as high as 370° C. at up to 210 bar and delivering it to an injection point just beyond the first pressure boundary in the reaction section of the extruder, although for proof-of-concept testing water was injected into the reactor section at from approximately 230-270° C. As indicated above, the point where water is injected is relevant because hot water injected at this location serves a dual purpose: first, to sweep biomass away from the downstream side of the first pressure boundary into the reaction section, and second, to lubricate the back side of the first pressure boundary and add lubrication that reduces the energy required to convey biomass across this dynamic seal.

Dual-Function, Variable-Restriction, Pressure-Sustaining Valve

Figure 8A:
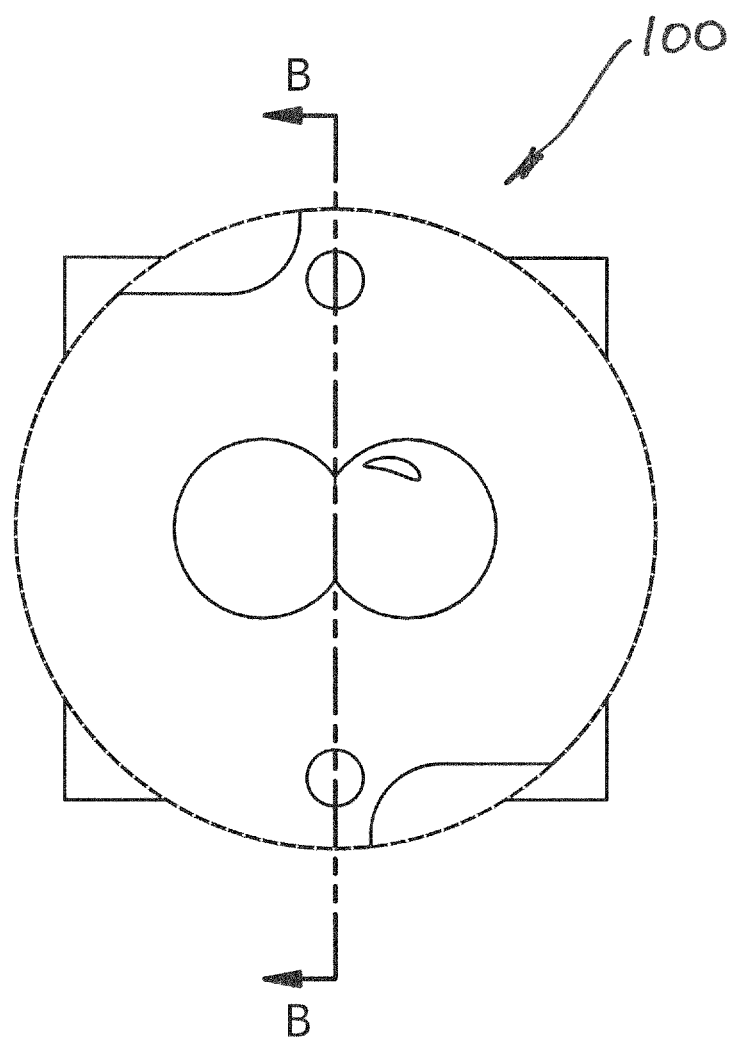
FIG. 8A shows a view of the exhaust end of the twin screw extruder, to which is attached the central feed die plate and the dual-function variable restriction pressure sustaining valve, indicating the plane of Section B-B, according to one preferred embodiment.
Figure 8B:
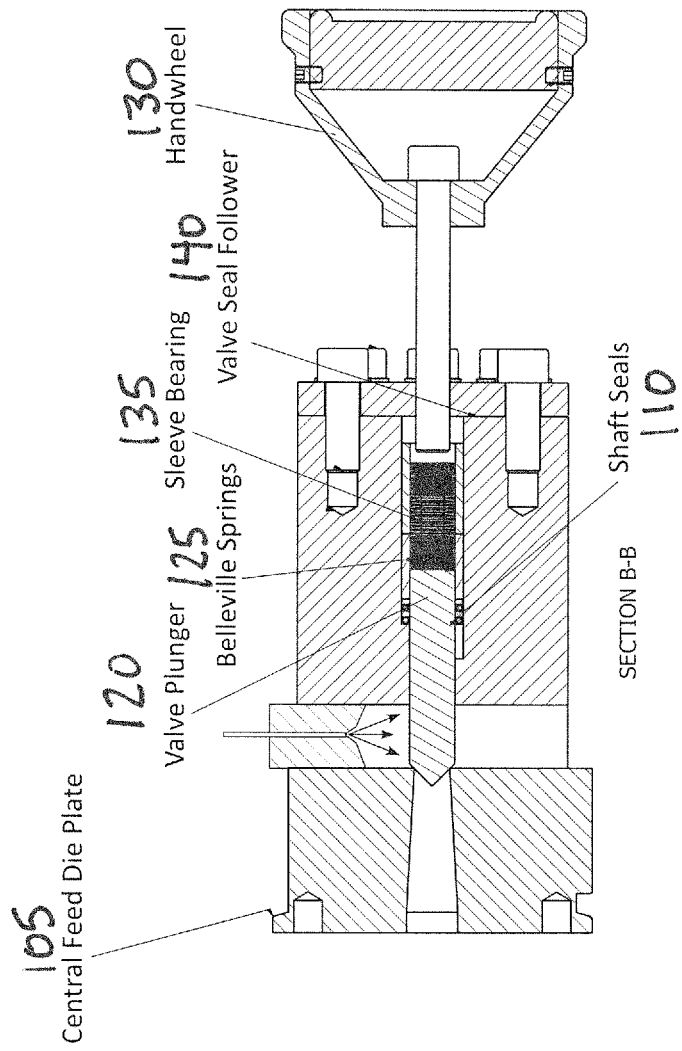
FIG. 8B shows a cross-sectional view of the central feed die plate and the dual-function variable restriction pressure sustaining valve, taken along Section B-B, according to one preferred embodiment.

A dual-function variable restriction valve 100 in association with the TSE enables proper process functionality as it permits a quasi-steady-state process to be carried out within the extruder while controlling the delivery of an HTC product to a much lower pressure (atmospheric pressure and ambient temperature) or a pressure and temperature between that of the extruder outlet and ambient. FIGS. 8A and 8B show one embodiment of a valve 100 according to a preferred embodiment that was employed in proof-of-concept testing.

The dual-function variable restriction pressure sustaining valve 100 shown in FIG. 8 preferably incorporates a spring-loaded valve plunger 120 that can be preloaded by tightening a calibrated handwheel 130 to a predetermined setting (first function). The valve 100 is preferably attached to the TSE central feed dieplate 105 which is located at the end of the extruder, such as the extruder 60 shown in FIGS. 5A and 5B. Shaft seals 110, Belleville springs 125, a sleeve bearing 135 and a valve seal follower 140 complete the particular embodiment shown in FIG. 8B.

In practice, the valve 100 is first set to provide a low level of resistance. As HTC production commences, tension (resistance) on the valve plunger 120 is increased until HTC product and liquids are released every 2-5 seconds, preferably in a regular, controlled manner (second function). This controlled release of HTC solids, liquids, and vaporized liquids has been observed to continue every 2-5 seconds for as long as the TSE is operated at a constant input feed rate of biomass and level of hot water injection (constant, uneventful operation for up to four hours has been documented). For one skilled in the art, based on the above design, other valve configurations and designs that will perform the important functions of a dual-function variable restriction pressure sustaining valve can be imagined.

Figure 9:
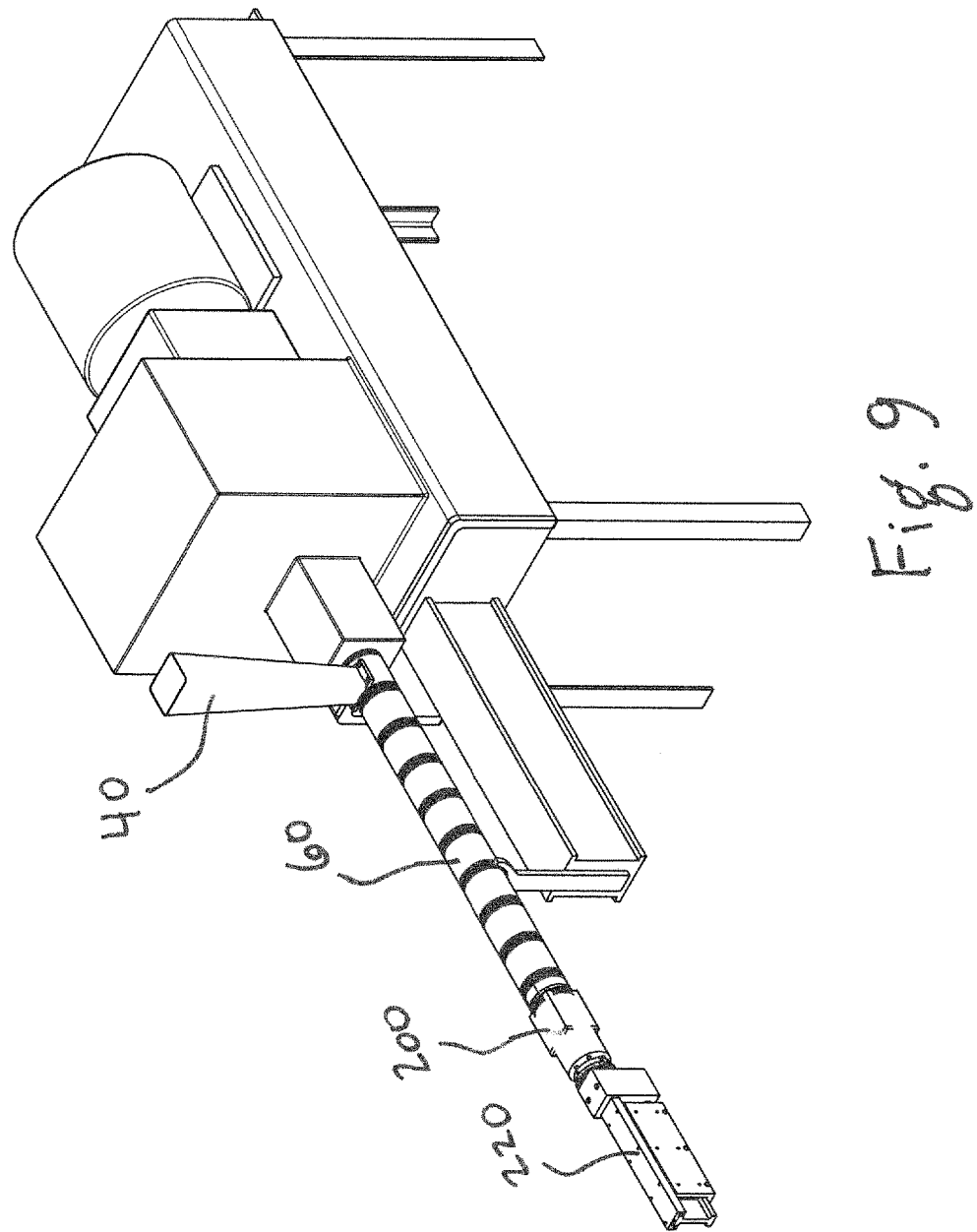
FIG. 9 shows a perspective side view of a system according to one preferred embodiment of this invention using an automated valve with a linear motor drive.

For example, the plunger can be connected to a linear motor stem controller and/or a load cell which monitors instantaneous resistance and a properly configured process feedback control system that balances that resistance against process pressure and other pertinent parameters upstream of the central feed dieplate to maintain a more or less constant product discharge to ambient. FIG. 9 shows a perspective side view of such a system according to one preferred embodiment of this invention using an automated valve 200 with a linear motor drive 220. FIG. 10A shows an end view of an automated pressure sustaining valve 200. FIG. 10B shows a cross-sectional view of the automated pressure sustaining valve 200 and the linear motor drive 220 shown in FIG. 10A, taken along Section B-B, according to one preferred embodiment.

HTC product and liquids may be reduced in pressure and delivered to a dewatering section which is followed by a pelletizing station so that pellets can be produced as a direct product. Likewise, with proper collection and fractional distillation, value-added organic liquids and acids produced by the process can be recovered and the remaining liquid can be recycled or disposed of as required.

The dual-function variable restriction pressure sustaining valve, or a device of similar functionality, as described above, allows for the reaction zone pressure to be created and stabilized while not requiring the screw RPM, material and water feed rate and product material characteristics (e.g., viscosity, fiber length, fiber strength, moisture content, etc.) to be separately controlled to maintain HTC product quality at the end of the reaction section. These specific features allow the process to be brought from a full stop to stable HTC processing in ~1 minute and do not require management of the multitude of operating parameters that typical systems employ. Testing has also shown that in addition to quick startup, during stable HTC production, the system can be abruptly shut down (to simulate a process upset or loss of power), allowed to sit for approximately one minute, be restarted and resume stable HTC biomass production in less than one minute.

As previously mentioned, existing technologies teach that discrete process zones can be created by a multitude of methods, some of which include using reverse pitch screw elements or internal apertures that can be varied by external means. Standard teaching requires process parameters such as screw RPM, material feed rate, feed moisture content, reverse flight pitch, reverse flight cut area, rate of water injection and barrel temperatures to all be simultaneously managed during process startup in order to avoid exceeding available power requirements, stalling the system and achieving desired HTC biomass product characteristics. However, in the production of HTC biomass, TSE system configuration and settings required for startup change once the HTC reaction begins and in a system that does not incorporate the dual-function variable restriction pressure sustaining valve, as pressure increases in the hot downstream reactor section and HTC reactions commence, partially converted biomass, steam, and water will be explosively exhausted. This is because downstream pressure boundaries that employ reversed screw elements can function only as long as material properties and quantities required to maintain a pressure boundary do not change.

Early tests revealed that the second and third pairs of reversing elements do not contribute to process pressure in a measurable way once the HTC reaction has begun. This result is not expected to one having ordinary skill in the art because standard practice would be to use the reversing elements to control upstream reaction pressures. Devices that restrict available area within the extruder could offer functionality for HTC production because the degree to which they restrict the available cross-sectional area of the TSE (and thereby the back pressure) could be increased as the character of the exhausted product changes. However, the external dual-function variable restriction pressure sustaining valve offers overall lower mechanical complexity, cost, and improved serviceability.

General Process Considerations

The use of both single-screw and twin-screw extruders to process lignocellulosic biomass or its constituents into a variety of products is a known technology. However, in these and other known technologies, HTC biomass or an HTC biomass-like material is usually produced by employing means not taught by the novel technology described above. Likewise, no acids, polymerization agents, or co-polymerizing agents are required by the process disclosed here. While there are a variety of patents granted for the production of HTC biomass, they do not anticipate the rapid process taught here and do not stipulate or depend on the three essential process elements taught in this application (TSE, on-demand pressurized hot water, and a dual-function variable restriction pressure sustaining valve). When HTC biomass is formed from an extrusion process utilizing a TSE, pelletization can be incorporated within the HTC process with minimal difficulty and value-added liquid chemicals produced can be recovered, fractionated, and conveyed to the marketplace by the use of conventional chemical processing technology.

For example, as shown schematically in FIG. 11, a mixing section 150 may be incorporated with the system as described herein. In this preferred embodiment, hydrothermally carbonized biomass exiting the system is directed to the mixing section 150 where biomass prepared for forming is mixed with hydrothermally carbonized biomass and a resulting mixture is pelletized or briquetted. Similarly, hydrothermally carbonized biomass exiting the system may be directed to the mixing section 150 where torrefied biomass is mixed with hydrothermally carbonized biomass and the resulting mixture is pelletized or briquetted.

Alternatively, or in addition, the subject system may be used in connection with a recovery program whereby exiting liquids and gases are fractionated to recover organic liquid byproducts created during the hydrothermal carbonization of biomass that would otherwise exit the process. Further, exiting carbon dioxide gas may be separated, cooled, and compressed to recover carbon dioxide gas created during hydrothermal carbonization of biomass that would otherwise exit the process.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A system for the production of hydrothermally carbonized biomass comprising:
   an infeed for accepting biomass feed material;
   a twin screw extruder connected with respect to the infeed, the twin screw extruder having a length between the infeed and an outlet;
   a water heater having a volume of hot water at 230-300° C. connected with respect to at least one inlet within a reactor section along the length of the twin screw extruder, wherein the at least one inlet generally corresponds with a pressure boundary within the twin screw extruder; and
   a pressure sustaining valve connected at the outlet, wherein the valve opens to allow the hydrothermally carbonized biomass through the outlet, and the valve closes to maintain a pressure and temperature within the twin screw extruder, wherein the valve comprises a spring-loaded valve plunger over or within the outlet, wherein the valve plunger is adjustably preloaded by tightening a calibrated handwheel to a predetermined setting.

2. The system of claim 1 wherein the twin screw extruder includes a plurality of mixing elements and a plurality of reversing elements.

3. The system of claim 2 wherein the reversing elements are interspersed within the twin screw extruder to provide flow restrictions and/or pressure boundaries within the twin screw extruder.

4. The system of claim 1 wherein the twin screw extruder includes at least one reversing element and an increasing pitch on a mixing element between the infeed and the at least one reversing element.

5. The system of claim 1 wherein the liquid water inlet is positioned immediately following a first dynamic seal created between a mixing element and a reversing element within the twin screw extruder.

6. The system of claim 1 wherein the twin screw extruder includes an increasing pitch mixing element extending from the infeed.

7. The system of claim 1 wherein at least three reversing elements are positioned within the twin screw extruder resulting in at least three flow restrictions and/or pressure boundaries.

8. The system of claim 1 wherein the pressure sustaining valve includes a handwheel to adjust a desired pressure within the twin screw extruder.

9. The system of claim 1 wherein the pressure sustaining valve is regulated by a servo-actuated feedback-control system that uses pressure and temperature measurements within a reaction section of the twin-screw extruder to stabilize a pressure within the reaction section.

10. The system of claim 9 wherein the feedback-control system stabilizes pressure within the reaction section to within 5% to 10% of a process average value ranging between 25 and 100 bar.

11. The system of claim 1 wherein the pressure sustaining valve is regulated by a servo-actuated feedback-control system that uses pressure and temperature measurements within a reaction section of the twin-screw extruder to maintain an average Specific Mechanical Energy of the twin-screw extruder to a desired value.

12. The system of claim 11 wherein the desired value is within 5% of a process average value ranging between 20 and 80 Watt-hours/kilogram.

13. The system of claim 1 wherein the twin screw extruder comprises a plurality of aligned barrels, each barrel having a band heater.

14. The system of claim 1 further comprising a mixing section, wherein hydrothermally carbonized biomass exiting the system is directed to the mixing section where biomass prepared for forming is mixed with hydrothermally carbonized biomass and a resulting mixture is pelletized or briquetted.

15. The system of claim 1 further comprising a mixing section, wherein hydrothermally carbonized biomass exiting the system is directed to the mixing section where torrefied biomass is mixed with hydrothermally carbonized biomass and the resulting mixture is pelletized or briquetted.

16. The system of claim 1 wherein the valve opens the outlet and controls and maintains upstream pressure maintained in a reactor section of the twin screw extruder.

17. The system of claim 1 wherein the valve maintains a quasi-steady-state process within the twin screw extruder while controlling the delivery of the hydrothermally carbonized biomass through the outlet.

18. The system of claim 17, further comprising a control system in opening and closing combination with the valve, wherein the control system monitors resistance within the twin screw extruder to maintain a constant product discharge through the outlet.

19. A system for the production of hydrothermally carbonized biomass comprising:
- a supply of lignocellulosic biomass feed material;
- an infeed for accepting the lignocellulosic biomass feed material;
- a twin screw extruder connected with respect to the infeed, the twin screw extruder having a length between the infeed and an outlet;
- an high-pressure, high-temperature, on-demand hot water heater adapted to provide hot water at greater than 230° C. connected with respect to at least one inlet within a reactor section along the length of the twin screw extruder, wherein the at least one inlet generally corresponds with a pressure boundary within the twin screw extruder; and
- a pressure sustaining valve closing or covering the outlet, wherein the hydrothermally carbonized biomass is provided through the outlet upon an opening of the valve under pressure from within the twin screw extruder, wherein the valve comprises a spring-loaded valve plunger over or within the outlet, wherein the valve plunger is adjustably preloaded by tightening a calibrated handwheel to a predetermined setting.

\* \* \* \* \*